United States Patent Office 3,189,543
Patented June 15, 1965

3,189,543
GREASE YIELDS
Dean W. Criddle, Pleasant Hill, Calif., assignor to California Research Corporation, San Francisco, Calif., a corporation of Delaware
No Drawing. Filed Aug. 3, 1962, Ser. No. 214,504
5 Claims. (Cl. 252—18)

This invention is directed to lubricating grease compositions, more particularly to the use of certain agents to improve the yield of calcium base greases. These particular calcium base greases contain particular ratios of calcium 12-hydroxy stearate, calcium acetate, calcium carbonate and calcium hydroxide in combination.

During the past few years, there has been a noticeable trend in the grease art to blend grease compositions which can be used for more than one purpose; that is, the usefulness of grease compositions has been extended. These multi-purpose lubricants are rapidly displacing special purpose grease compositions throughout all fields where greases are used, particularly in the field of industrial greases. The grease compositions of the prior art, in particular those described in the patents noted hereinbelow, are useful as multi-purpose greases to a limited degree only, mainly because prior art greases lack high film strength. Furthermore, it is known that the surfaces of such grease compositions of the prior art crust upon ageing, making the grease undesirable for use. Contrary thereto, no crust forms on the surfaces of the grease compositions described herein, nor do the grease compositions harden upon ageing.

The grease art describes well the use of calcium soaps of fatty acids (e.g., calcium 12-hydroxy stearate) as grease thickening agents, and the use of metal salts of low molecular weight fatty acids (e.g., calcium acetate) as modifying agents for such grease compositions (e.g., calcium acetate as a modifying agent in grease compositions thickened with calcium 12-hydroxy stearate).

U.S. Patent No. 2,842,495 teaches that calcium acetate-calcium fatty acid soap grease compositions of high film strength are obtained by using large excesses of calcium acetate; that is, the calcium acetate/calcium fatty acid soap mol ratios must be at least 7 to 1, even as high as 40 to 1. Patentees point out that prior to their invention, greases having salt/soap mol ratios less than that noted had low film strength.

U.S. Patent No. 2,596,556 teaches that urea can be used as a complexing agent in the preparation of water resistant, high temperature grease compositions, emphasizing that such greases must be neutral.

In contrast to the compositions described hereinabove, applicant's greases have calcium acetate-calcium hydroxystearate mol ratios less than 5 to 1; and are basic. In the preparation of the grease compositions defined herein, it is necessary that the amount of basic compound is in excess of that sufficient to neutralize any saponifiable or salt-forming components.

Although, because of the uniqueness of the grease thickeners defined herein, smaller amounts of these grease thickeners are usually used to obtain greases having consistencies necessary for multi-purpose greases, the agents described hereinbelow still improve considerably the yield of such thickeners.

Grease compositions prepared according to the prior art, although they can be characterized as water resistant, high temperature greases, cannot be used where it is essential to have high film strength for proper lubrication of frictional surfaces.

It is a primary object of this invention to describe certain agents which will increase the yield of calcium 12-hydroxy stearate grease compositions having exceptionally high film strengths and using low acetate-hydroxy stearate ratios.

In accordance with this invention, a process has been discovered whereby the yields of grease compositions are increased by incorporating therein an oil-soluble polyglycol polymer, which grease composition contains a calcium soap of 12-hydroxy stearic acid (or its equivalent), calcium acetate in amount of from 2 mols to 5 mols for each mol of said calcium soap of 12-hydroxy stearic acid, excess base expressed as calcium hydroxide, and calcium carbonate in amounts sufficient to impart improved consistency to said grease composition, which calcium carbonate is obtained by reacting urea with calcium hydroxide.

Although the grease compositions have amounts of base (i.e., calcium hydroxide) in excess of that necessary for the neutralization of the acidic components used in the preparation of the grease, such base need not be present in the finished grease as calcium hydroxide. This excess base is expressed herein as free calcium hydroxide; however, such base may form basic salts, for example, basic calcium carbonate, basic calcium acetate, and basic calcium 12-hydroxy stearate. No theory is postulated herein to explain the possibility of basic salt formation.

The grease compositions described in this invention are water-resistant, have high film strength, have improved work stability, and have excellent high temperature characteristics. The grease compositions formed according to this invention have ASTM dropping points as high as 700° F. and higher. Such greases can be used in steel mills, automobile and truck chassis, rock crushers, electric powered excavation equipment, shaking screens, cement plants, railroad service (particularly journal bearings), in aviation equipment, etc.

The oil-soluble polyglycol polymers are fully described in U.S. Patent 2,892,783, and in U.S. patent application Serial No. 38,750, filed June 27, 1960, and now abandoned.

Such polyglycol polymers include:
(I) Oil soluble-polyglycol substituted polymers of at least one monomer, which monomer contains a single polymerizable ethylenic bond and the polymer contains from about 40 to about 96% by weight of hydrocarbon oil-solubilizing groups from the polymerized monomer and from about 4 to about 60% by weight of polyglycol groups, which are aliphatic or cycloaliphatic hydrocarbon groups of at least 4 carbon atoms each. The polyglycol groups are polyalkylene glycols or monoalkyl ethers thereof having from 2 to 7 carbon atoms in each alkylene group and a molecular weight between about 220 and 30,000. The polymer is substantially saturated and has a total molecular weight of at least about 50,000 and a solubility in oil of at least 0.5% by weight. The polyglycols have at least 5 alkylene oxide units each and are attached by a single thermally stable organic linking group to the polymer, and (II) The reaction product of polyalkylene polyamines with I hereinabove.

The polyglycol additive is a predominantly aliphatic hydrocarbon macro-molecule having polyglycol groups which comprises up to about 99.9% by weight of hydrocarbon oil-solubilizing groups selected from the class consisting of aliphatic and cycloaliphatic hydrocarbon groups of at least 4 carbon atoms each and at least about 0.1% by weight of polyglycol groups having at least 5 alkylene oxide units in each polyglycol group and from 2 to 7 carbon atoms in each alkylene oxide unit, said macro-molecule having an average molecular weight of at least about 50,000 and a solubility in oil of at least 0.5% by weight.

The aliphatic hydrocarbon portion provides the oil solubility to the additive and the polyglycol portion provides the polarity to the additive. Other groups characteristic of macro-molecule lubricating oil additives, including other polar groups besides the polyglycol groups, may be incorporated without substantially altering the desirable properties.

The predominantly aliphatic hydrocarbon macro-molecule of the invention due to its high molecular weight of at least 50,000 is most suitably a polymeric type compound. For example, satisfactory polyglycol additives are obtained by attaching polyglycol groups to ethylene, propylene or isobutylene polymers by means of suitable linking groups. Particularly suitable hydrocarbon macro-molecules are obtained by copolymerizing (A) oil solubilizing olefins of 2 to 30 carbon atoms or monomeric compounds having a polymerizable ethylenic group and containing a hydrocarbon group of from 4 to 30 aliphatic carbon atoms, (B) polyglycol monomeric compounds having a polymerizable ethylenic linkage and a polyglycol group containing at least 5 alkylene oxide units in which each alkylene oxide unit has from 2 to 7 carbon atoms and, optionally, (C) monomeric polar compounds having a polymerizable ethylenic linkage and a polar group of the type mentioned above.

The oil-solubilizing monomer portion of the polymeric additives of this invention can be any compound having at least one ethylenic linkage (>C=C<), together with at least one substituent group which contains an oil-solubilizing hydrocarbon group of from 4 to 30 aliphatic carbon atoms, and which is characterized by the ability to copolymerize through said ethylenic linkage with the polar monomer referred to above in the presence of a suitable catalyst. Alternatively, the oil-solubilizing aliphatic radical can be introduced into the copolymer, as will hereinafter be more fully described. This aliphatic radical, whether present in the original monomer or introduced into the copolymer, imparts oil solubility to the polymer and is preferably a branched or straight-chain alkyl radical or a cycloalkyl radical such as butyl, isobutyl, n-pentyl, n-hexyl, 2-ethylhexyl, decyl, dodecyl, tetradecyl, cyclohexyl, 4-ethylcyclohexyl, or the like, or an alkenyl radical such as oleyl, ricinoleyl, or the like, wherein the ethylenic double bond has substantially no copolymerizing tendency. Oil solubilizing monomers of this general character are well known in the art and are frequently employed as the oil-solubilizing portion of copolymers which are added to lubricating oils to improve the viscosity index and pour point characteristics thereof. They include such materials as olefins and ethylenically unsaturated ethers, esters, ketones, aldehydes, and the like.

The oil solubilizing monomeric compounds of component (A) may also be illustrated by the following general formula $$R_1(G')_n \cdot CH=CH(G)_n R_2$$

in which $R_1$ and $R_2$ are members of the group consisting of hydrogen and hydrocarbon radicals of from 4 to 30 carbon atoms, at least one of which contains an aliphatic hydrocarbon group of from 4 to 30 carbon atoms as described above, G and G' are members of the class consisting of oxy carbonyl (—O—)

and carbonyloxy

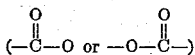

groups and combinations thereof with not more than two alkylene groups of from 1 to 7 carbon atoms each, and $n$ and $n'$ are 0 or 1. When $R_1$ and $R_2$ are hydrocarbon radicals, they may be alkyl, cycloalkyl, alkenyl, cycloalkenyl, aryl, alkaryl or aralkyl in structure, as illustrated by radicals such as 2-ethylhexyl, cyclohexyl, hexenyl, cyclohexenyl, phenyl, naphthyl, tertiary butylphenyl, benzyl, etc., with the preferred radicals being as previously mentioned.

Representative oil-solubilizing olefins and monomeric compounds of the aforementioned types which can be employed to form the copolymeric additives of the present invention include the following:

OLEFINS

| | |
|---|---|
| Ethylene | Hexadecene-1 |
| Propylene | Cyclohexene |
| Butene-1 | Octadecene-1 |
| Isobutene | 4-octylcyclohexene-1 |
| Pentene-1 | 3-phenylhexadecene-1 |
| Hexene-1 | p-Octylstyrene |
| 2-ethylhexene-1 | Vinylcyclohexane |
| Di- and triisobutylene | 2-hexadecylbutadiene-1,3 |
| Tripropylene | p-Tertiarybutylstyrene |
| Dodecene-1 | |

ETHERS

| | |
|---|---|
| Vinyl n-butyl ether | Propenyl 2-ethylhexyl ether |
| Vinyl 2-ethylhexyl ether | Crotyl n-octyl ether |
| Allyl isobutyl ether | 1-decenyl butyl ether |
| Allyl cyclohexyl ether | 1-eicosenyl decyl ether |
| Allyl 4,4,8,8-tetramethyl-docosyl ether | Vinyl p-octylphenyl ether |
| Methallyl n-hexyl ether | methallyl p-tert.butyl-phenyl ether |
| Methallyl n-decyl ether | 1-decenyl p-cetylphenyl ether |
| Methallyl 2-ethylhexyl ether | 1-decenyl 2-phenylbutyl ether |
| Methallyl octadecyl ether | |

ESTERS

| | |
|---|---|
| Vinyl caproate | p-Isoamylphenyl 2-hexadecenoate |
| Vinyl palmitate | 4-p-tolylbutyl 2-octadecenoate |
| Vinyl oleate | |
| Allyl caprylate | Undecyl cinnamate |
| Allyl laurate | Methylcyclohexyl 2-ethyl-2-hexenoate |
| Allyl oleate | 5-ethyldocosyl crotonate |
| Allyl palmitate | Octadecyl isocrotonate |
| Allyl stearate | N-butyl 2-eicosenoate |
| Allyl-2-ethylhexanoate | p-Tert.amylphenyl octadecyl maleate |
| Allyl ricinoleate | |
| Allyl esters of babassu acids | p-Hexadecylphenyl 2-ethylhexyl maleate |
| Allyl esters of lard acids | |
| Allyl naphthenate | O-tolyl 2-octadecylcyclohexyl maleate |
| Methallyl caproate | |
| Methallyl naphthenate | O-nonylphenyl-hexadecyl maleate |
| Methallyl ricinoleate | |
| Methallyl p-octybenzoate | Dihexadecyl maleate |
| Methallyl oleate | Di-methylcyclohexyl maleate |
| Methallyl cyclohexane carboxylate | |
| Methallyl palmitate | Mono-2-ethylhexyl maleate |
| Crotyl oleate | |
| Crotyl naphthenate | Di-2-ethylhexyl maleate |
| α-Methylcrotyl palmitate | Di-dodecyl maleate |
| 1-propenyl naphthenate | Di-dodecyl fumarate |
| 1-propenyl elaidate | Di-dodecyl mesaconate |
| Dodecyl acrylate | Di-dodecyl citraconate |
| Hexadecyl methacrylate | o-Tolyl octadecyl itaconate |
| Isobutyl α-decylacrylate | |
| Vinyl p-n-octyl benzoate | Mono-hexadecyl itaconate |
| Allyl 3,5-diisobutyl benzoate | Isopropenyl palmitoleate |
| | 1-decenyl laurate |
| Cyclohexyl 2-dodecenoate | 1-hexadecenyl myristate |
| Decyl vinylacetate | Cyclohexyl methacrylate |
| Isooctyl α-chloroacrylate | |

Representative amino compounds which can be reacted with the copolymers as described above include:

ALIPHATIC AMINES

Propyl amine
Octadecyl amine
Ethylene diamine
N,N-dimethyl propylene diamine
Ethanolamine
Aminoethyl ethanolamine
Diethanolamine
N-oleamide of hydroxyethyl ethylene diamine
Diethylene triamine
Tetraethylene pentamine
N-aminoethyl stearyl imidazoline

AROMATIC AMINES

Pyrrole
N-2-aminoethyl-piperazine
N-aminopropyl-morpholine
Aniline
Methylaniline
Toluidine
Xylidine
Phenylenediamine Although any of the oil solubilizing compounds described above will give effective copolymer compositions for lubricant compositions in accordance with the present invention, higher alkyl esters of $\alpha,\beta$-unsaturated monocarboxylic acids of from 3 to 6 carbon atoms having alkyl groups of from 8 to 30 carbon atoms are most preferred, both for availability and effectiveness of copolymers prepared from them. Representative acids of this type are the acrylic, methacrylic, crotonic, tiglic, angelic, $\alpha$-ethylacrylic, $\alpha$-methylcrotonic, $\alpha$-ethylcrotonic, $\beta$-ethylcrotonic, $\beta$-propycrotonic, and hydrosorbic acids and the like. Even more desirable are the alkyl esters of acrylic and methacrylic acids containing from 10 to 20 carbon atoms in the alkyl groups, since they are found to provide highly superior polymers for the lubricant compositions of the invention and are obtainable in commercial quantities.

Various copolymers employing representative oil-solubilizing monomers of the foregoing types are exemplified as follows:

The amino compounds are reacted with the polyglycol polymers described hereinabove at temperatures from 150 to 350° F., in amino compound/polyglycolpolymer weight ratios of 1:10 to 1:700. Using "C" as a symbol to represent the amino group, and the letters A and B to represent the specific groups of I hereinabove, the ratios of A to B to C can vary from 5:1:1 to 100:1:1.

*Table I*

| Exemplified glycol polymers | Ratio of (1) monomer to (2) monomer to (3) monomer, etc. |
|---|---|
| A. (1) Tridecyl methacrylate, (2) octadecyl methacrylate, (3) monododecyl ether of hexadecaethylene glycol methacrylate | 10/6/1 |
| B. (1) Vinyl stearate, (2) maleic anhydride, (3) monododecyl ether of pentaethylene glycol methacrylate, (4) methacrylamide | 30/1/2/1 |
| C. (1) Hexene-1, (2) dodecyl methacrylate, (3) methacrylic acid, (4) monododecyl ether of eicosaethylene glycol methacrylate | 25/25/1/4 |
| D. (1) Di-2-ethylhexyl fumarate, (2) octadecene-1, (3) crotonic acid, (4) monotridecyl ether of decaethylene glycol methacrylate | 25/25/8/2 |
| E. (1) Allyl ethyl ether, (2) vinyl stearate, (3) itaconic acid, (4) monododecyl ether of decaethylene glycol crotonate | 14/50/7/3 |
| F. (1) Dodecyl acrylate, (2) monododecyl ether of decaethylene glycol acrylate, (3) acrylic acid | 780/9/1 |

As used herein, the term "calcium soap of 12-hydroxy stearic acid" also includes the calcium soap of hydrogenated ricinoleic acid.

The calcium 12-hydroxy stearate is used in amounts sufficient to thicken oils of lubricating viscosity to the consistency of a grease; that is, in amounts ranging from 5% to 25%, by weight, preferably 7% to 12%, by weight.

The calcium acetate is used in amounts of 4% to 25%, by weight, 6% to 12% by weight, being preferred.

For the desired characteristics of the final grease composition, it is essential that the above-named components be present in the grease composition in certain proportions with respect to each other. For example, it is essential that the mol ratio of the calcium acetate to the calcium 12-hydroxy stearate have values less than 5; ranging preferably from 2 to 5; that is, that the calcium acetate/calcium 12-hydroxy stearate mol ratio be from 2:1 to 5:1.

The calcium carbonate present as a component in the final grease composition (which component increases the consistency of the grease) is obtained by the reaction of urea with calcium hydroxide during the preparation of the grease. Based on the finished grease, urea is used in amounts of about 1.0% to about 6.0% by weight. Since 1 mol of urea is believed to react with 1 mol of calcium hydroxide to form the calcium carbonate, the finished grease composition thus prepared has from about 1.7% to about 10.0%, by weight, of calcium carbonate; preferably about 2.0% to about 6.0%, by weight.

It is essential that the calcium hydroxide be used in an amount in excess of that necessary to form calcium 12-hydroxy stearate from the 12-hydroxy stearic acid, calcium acetate from the acetic acid, and calcium carbonate from reaction with urea. The excess calcium hydroxide is such that the finished grease has from 1% to 8%, by weight, of excess base expressed as calcium hydroxide.

The polyglycol copolymers effective herein to harden the calcium base grease, that is, to increase the yield of the calcium grease thickeners, are used in amounts of 0.1% to 10% by weight, preferably 0.5% to 3.0% by weight. For the purpose of brevity, whenever the term "polyglycol polymer" is used herein, such term means the above-described copolymers.

In the preparation of the grease described in U.S. Patent No. 2,596,556 noted hereinabove, wherein urea is a complexing agent, there can be an excess of 0.1 to 3 equivalents of calcium hydroxide per equivalent of calcium 12-hydroxy stearate. However, in the preparation of the grease composition described herein, it is essential to use from 6 to 18 equivalents of calcium hydroxide per equivalent of calcium 12-hydroxy stearate.

Lubricating oils which are suitable as base oils for the grease compositions of this invention include a wide variety of oils, such as mineral oils, as exemplified by the naphthenic base, paraffin base, and mixed base oils derived from petroleum, including lubricating oils derived from coal products, etc.

The grease compositions of the invention can be prepared by blending the 12-hydroxy stearic acid (or the alkyl ester thereof) with an oil, and heating the blend sufficiently to disperse the acid in the oil. A large excess of calcium hydroxide (i.e., from 6 to 18 equivalents per equivalent of 12-hydroxy stearic acid) is then added and the whole mixture stirred to obtain a uniform dispersion of the resulting soap in the oil. The mixture is then heated to a temperature of about 180° F., after which the acetic acid is added slowly. The whole mixture is stirred for a period of time sufficient to obtain a smooth dispersion, after which the urea is added, and the mixture is heated to a temperature of about 320° F. under a pressure of 70 to 95 p.s.i. This pressure range, which is not critical, is maintained by bleeding into the atmosphere the ammonia formed during the conversion of the urea. The mixture is then heated to about 320° F. at atmospheric pressure for the purpose of completing the reaction, at which time the polyglycol polymer may be added. The polymer may be added after the grease has cooled to ambient temperatures.

The examples hereinbelow illustrate the preparation of grease compositions of this invention.

EXAMPLE I

A mixture of 7.9%, by weight, of 12-hydroxy stearic acid and about 45%, by weight, of a California solvent refined paraffinic base oil having a viscosity of 480 SSU at 100° F. was heated to a temperature of 130° F. 15% of hydrated lime was then added and the mixture was agitated at 130° F. for a period of time sufficient to form a uniform blend. The whole mixture was heated to 180°

F. and maintained at that temperature for a period of 30 minutes, after which 8%, by weight, of acetic acid was added slowly during a period of 30 to 45 minutes. 10% of the same oil described hereinabove was then added, after which there was added 2.2%, by weight, of urea, and the mixture was heated to 320° F. at a pressure of 70–90 p.s.i. for a period of one hour. The whole mixture was then heated at 330° F. at atmospheric pressure, followed by the addition of 1.5% of oxidation and rust inhibitors, 3% of a polyglycol polymer, and the remainder of the oil to make 100%.

As exemplified hereinabove in Example II, the grease may also be prepared by the use of an ester of 12-hydroxy stearic acid.

EXAMPLE II

A mixture of 7.9% of methyl 12-hydroxy stearate and 45% of a California solvent refined paraffinic base oil having a viscosity of 480 SSU at 100° F. was blended at room temperature, then heated to a temperature ranging from 180° F. to 190° F. The mixture was then cooled to a temperature of 180° F. to 190° F. for a time sufficient to disperse the methyl 12-hydroxy stearate in the oil. The mixture was then cooled to 130° F. followed by addition of 15% by weight of calcium hydroxide, after which the mixture was agitated at 130° F. to obtain a uniform dispersion in the oil. There was then added 0.1% sodium hydroxide (added as 1% sodium hydroxide in water, used herein as a catalyst), and the whole mixture was heated to 180°–200° F. for a period of 30 minutes, after which 8.0% of glacial acetic acid was added over a period of time of about 30–45 minutes. At this point there may be added 10%, by weight, of the lubricating oil described hereinabove. 2.2% by weight, of urea was then added at 180° F., followed by sealing the mixture from the atmosphere and heating to 320° F. at 70–90 p.s.i. for a period of about one hour. The mixture was then vented to the atmosphere and heated at 330° F. for a period of one hour at atmospheric pressure, followed by the addition of 1.5% of oxidation and rust inhibitors, 3% of the polyglycol polymer, and the balance of the oil to make a total of 100%.

Table II hereinbelow sets forth the components used in the preparation of greases to which were added the copolymers.

Table II

| Components used in preparation of grease base | Grease No. 1 | Grease No. 2 |
| --- | --- | --- |
| 1. Methyl 12-hydroxy stearate | 7.9 | 7.2 |
| 2. Glacial acetic acid | 8.0 | 7.3 |
| 3. Urea | 2.2 | 2.0 |
| 4. Hydrated lime | 15.0 | 13.7 |
| 5. Sodium hydroxide | ¹0.1 | ¹0.1 |
| 6. Base oil | 66.5 | 68.7 |
| 7. Oxidation and rust inhibitors | 0.3 | 1.0 |

¹ Catalyst.

The base oils for Grease 1 was a blend consisting of, on a weight basis, 50% of a California paraffin base oil having a viscosity of 145 SSU at 100° F., 36% of a California naphthenic base oil having a viscosity of 2100 SSU at 100° F., and 14% of a California paraffinic base oil having a viscosity of 2400 SSU at 100° F.

The base oil for Grease 2 was a California base oil having a viscosity of 500 SSU at 100° F.

Table III hereinbelow illustrates the effectiveness of the polyglycol copolymers in increasing the yield of the calcium greases described herein. The grease numbers refer to the base greases of Table II hereinabove.

Copolymer "A" was a 40% oil concentrate of a terpolymer of dodecyl methacrylate, methacrylic acid, and decaethylene glycol tallow ether in molar ratio of 7.3/0.8/0.2.

Copolymer "B" was a 40% oil concentrate of the reaction product of dimethylaminopropylamine with the quadripolymers of dodecylmethacrylate, octadecyl methacrylate, polyethylene glycol methacrylate, and glycidyl methacrylate in molar ratios of 33/17/1/1.

Table III

| Composition | ASTM Penetrations | |
| --- | --- | --- |
| | Worked (60) | Unworked |
| Grease No. 1: | | |
| Base Oil | >600 | >600 |
| Base Oil plus 2% weight Copolymer ¹ | >600 | >600 |
| Grease Base | 343 | 324 |
| Grease Base: | | |
| Plus 2 weight percent Copolymer A | 324 | 289 |
| Plus 2 weight percent Copolymer B | 317 | 263 |
| Grease No. 2: | | |
| Base Oil | >600 | >600 |
| Base Oil plus 2 weight percent Copolymer ¹ | >600 | >600 |
| Grease Base | 319 | 277 |
| Plus 2% Copolymer A | 281 | 268 |
| Plus 2% Copolymer B | 271 | 263 |

¹ Either Copolymer A or Copolymer B.

The data of the Table III hereinabove clearly shows that the polyglycol polymers defined herein effectively harden the highly basic calcium 12-hydroxystearate-calcium acetate greases herein, that is, increase their yield. The polyglycol polymers described herein have no effect on the yield of normal calcium base greases. For example, the addition of 2% of Copolymer B to a grease thickened with 10.5% (by weight) of a calcium soap of tallow fatty acids had no effect whatsoever on the yield of the grease.

I claim:

1. A grease composition comprising a major proportion of an oil of lubricating viscosity, from 7% to 12% by weight of calcium 12-hydroxy stearate, from 4% to 25% by weight, of calcium acetate, excess alkalinity in amount of about 1.0% to about 8.0% by weight expressed as calcium hydroxide, from 1.7% to about 10.0% by weight of calcium carbonate, wherein the mole ratio of said calcium acetate to said calcium 12-hydroxy stearate has a value from 2 to 5, and from 0.5% to 3% by weight of an oil-soluble polyglycol substituted polymer of at least one monomer, said monomer containing a single polymerization ethylenic bond and said polymer containing from about 40 to about 96% by weight of hydrocarbon oil-solubilizing groups from said polymerized monomer and from about 4 to about 60% by weight of polyglycol groups, said oil-solubilizing groups being selected from the class consisting of aliphatic and cycloaliphatic hydrocarbon groups of at least 4 carbon atoms each, said polyglycol groups being selected from the class consisting of polyalkylene glycols and monoalkyl ethers thereof having from 2 to 7 carbon atoms in each alkylene group and a molecular weight between about 220 and 30,000, said polymer being substantially saturated and having a total molecular weight of at least about 50,000 and a solubility in oil of at least 0.5% by weight, said polyglycols having at least 5 alkylene oxide units each and being attached by a single thermally stable organic linking group to said polymer wherein said organic linking group is selected from the group consisting of alkylene groups having from 1 to 7 carbon atoms, oxy, carbonyl, and carbonyloxy groups and combinations thereof with alkylene groups having from 1 to 7 carbon atoms.

2. A grease composition comprising a major proportion of an oil of lubricating viscosity, from 5% to 25% by weight of calcium 12-hydroxy stearate, from 4% to 25% by weight, of calcium acetate, excess alkalinity in amount of about 1.0% to about 8.0% by weight expressed as calcium hydroxide, and from 1.7% to about 10.0% by weight of calcium carbonate, wherein the mol ratio of said calcium acetate to said calcium 12-hydroxy stearate has a value from 2 to 5, and from 0.5% to 3% by weight of an oil-soluble polyglycol substituted polymer of at least one monomer, said monomer containing a single polymerizable ethylenic bond and said polymer containing from about 40 to about 96% by weight of hydrocarbon oil-solubilizing groups from said polymerized monomer and from about 4 to about 60% by weight of polyglycol groups, said oil-solubilizing groups being selected from the class consisting of aliphatic and cycloaliphatic hydrocarbon groups of at least 4 carbon atoms each, said polyglycol groups being selected from the class consisting of polyalkylene glycols and monoalkyl ethers thereof having from 2 to 7 carbon atoms in each alkylene group and a molecular weight between about 220 and 30,000, said polymer being substantially saturated and having a total molecular weight of at least about 50,000 and a solubility in oil of at least 0.5% by weight, said polyglycols having at least 5 alkylene oxide units each and being attached by a single thermally stable organic linking group to said polymer wherein said organic linking group is selected from the group consisting of alkylene groups having from 1 to 7 carbon atoms, oxy, carbonyl, and carbonyloxy groups and combinations thereof with alkylene groups having from 1 to 7 carbon atoms.

3. A grease composition comprising a major proportion of an oil of lubricating viscosity, from 7% to 12% by weight of calcium 12-hydroxy stearate, from 4% to 25% by weight of calcium acetate, excess alkalinity in amount of about 1.0% to about 8.0% by weight expressed as calcium hydroxide, from 1.7% to about 10.0% by weight of calcium carbonate, wherein the mol ratio of said calcium acetate to said calcium 12-hydroxy stearate has a value from 2 to 5, and from 0.1% to 10% by weight of a polyglycol polymer selected from the group consisting of (I) oil-soluble polyglycol substituted polymers of at least one monomer, said monomer containing a single polymerizable ethylenic bond and said polymer containing from about 40 to about 96% by weight of hydrocarbon oil-solubilizing groups from said polymerized monomer and from about 4 to about 60% by weight of polyglycol groups, said oil-solubilizing groups being selected from the class consisting of aliphatic and cycloaliphatic hydrocarbon groups of at least 4 carbon atoms each, said polyglycol groups being selected from the class consisting of polyalkylene glycols and monoalkyl ethers thereof having from 2 to 7 carbon atoms in each alkylene group and a molecular weight between about 220 and 30,000, said polymer being substantially saturated and having a total molecular weight of at least about 50,000 and a solubility in oil of at least 0.5% by weight, said polyglycols having at least 5 alkylene oxide units each and being attached by a single thermally stable organic linking group to said polymer, and wherein said organic linking group is selected from the group consisting of alkylene groups having from 1 to 7 carbon atoms, oxy, carbonyl, carbonyloxy groups and combinations thereof with alkylene groups having from 1 to 7 carbon atoms, and (II) the reaction product of polyalkylene polyamines with I.

4. A grease composition comprising a major proportion of an oil of lubricating viscosity, from 7% to 12% by weight of calcium 12-hydroxy stearate, from 4% to 25% by weight of calcium acetate, excess alkalinity in amount of about 1% to 8% by weight expressed as calcium hydroxide, from 1.7% to about 10.0% by weight of calcium carbonate, wherein the mol ratio of said calcium acetate to said calcium 12-hydroxy stearate has a value from 2 to 5, and from 0.5% to 3% by weight of a polyglycol polymer selected from the group consisting of (I) oil-soluble polyglycol substituted polymers of at least one monomer, said monomer containing a single polymerizable ethylenic bond and said polymer containing from about 40 to about 96% by weight of hydrocarbon oil-solubilizing groups from said polymerized monomer and from about 4 to about 60% by weight of polyglycol groups, said oil-solubilizing groups being selected from the class consisting of aliphatic and cycloaliphatic hydrocarbon groups of at least 4 carbon atoms each, said polyglycol groups being selected from the class consisting of polyalkylene glycols and monoalkyl ethers thereof having from 2 to 7 carbon atoms in each alkylene group and a molecular weight between about 220 and 30,000, said polymer being substantially saturated and having a total molecular weight of at least about 50,000 and a solubility in oil of at least 0.5% by weight, said polyglycols having at least 5 alkylene oxide units each and being attached by a single thermally stable organic linking group to said polymer, and wherein said organic linking group is selected from the group consisting of alkylene groups having from 1 to 7 carbon atoms, oxy, carbonyl, carbonyloxy groups and combinations thereof with alkylene groups having from 1 to 7 carbon atoms, and (II) the reaction product of polyalkylene polyamines with I.

5. A grease composition comprising a major proportion of an oil of lubricating viscosity, from 7% to 12% by weight of calcium 12-hydroxy stearate, from 4% to 25% by weight, of calcium acetate, excess alkalinity in amount of about 1.0% to about 8.0% by weight expressed as calcium hydroxide, and from 1.7% to about 10.0% by weight of calcium carbonate, wherein the mol ratio of said calcium acetate to said calcium 12-hydroxy stearate has a value from 2 to 5, and from 0.1% to 10% by weight of an oil-soluble polyglycol substituted polymer of at least one monomer, said monomer containing a single polymerizable ethylenic bond and said polymer containing from about 40 to about 96% by weight of hydrocarbon oil-solubilizing groups from said polymerized monomer and from about 4 to about 60% by weight of polyglycol groups, said oil-solubilizing groups being selected from the class consisting of aliphatic and cycloaliphatic hydrocarbon groups of at least 4 carbon atoms each, said polyglycol groups being selected from the class consisting of polyalkylene glycols and monoalkyl ethers thereof having from 2 to 7 carbon atoms in each alkylene group and a molecular weight between about 220 and 30,000, said polymer being substantially saturated and having a total molecular weight of at least about 50,000 and a solubility in oil of at least 0.5% by weight, said polyglycols having at least 5 alkylene oxide units each and being attached by a single thermally stable organic linking group to said polymer wherein said organic linking group is selected from the group consisting of alkylene groups having from 1 to 7 carbon atoms, oxy, carbonyl, and carbonyloxy groups and combinations thereof with alkylene groups having from 1 to 7 carbon atoms.

References Cited by the Examiner

UNITED STATES PATENTS

| | | | |
|---|---|---|---|
| 2,417,428 | 3/47 | McLennan | 252—39 XR |
| 2,595,556 | 5/52 | Worth et al. | 252—40.7 |
| 2,892,783 | 6/59 | Stuart et al. | 252—32.7 |
| 3,007,866 | 11/61 | Chamberlin | 252—22 |

DANIEL E. WYMAN, *Primary Examiner.*

JOSEPH R. LIBERMAN, *Examiner.*